Figure 1:
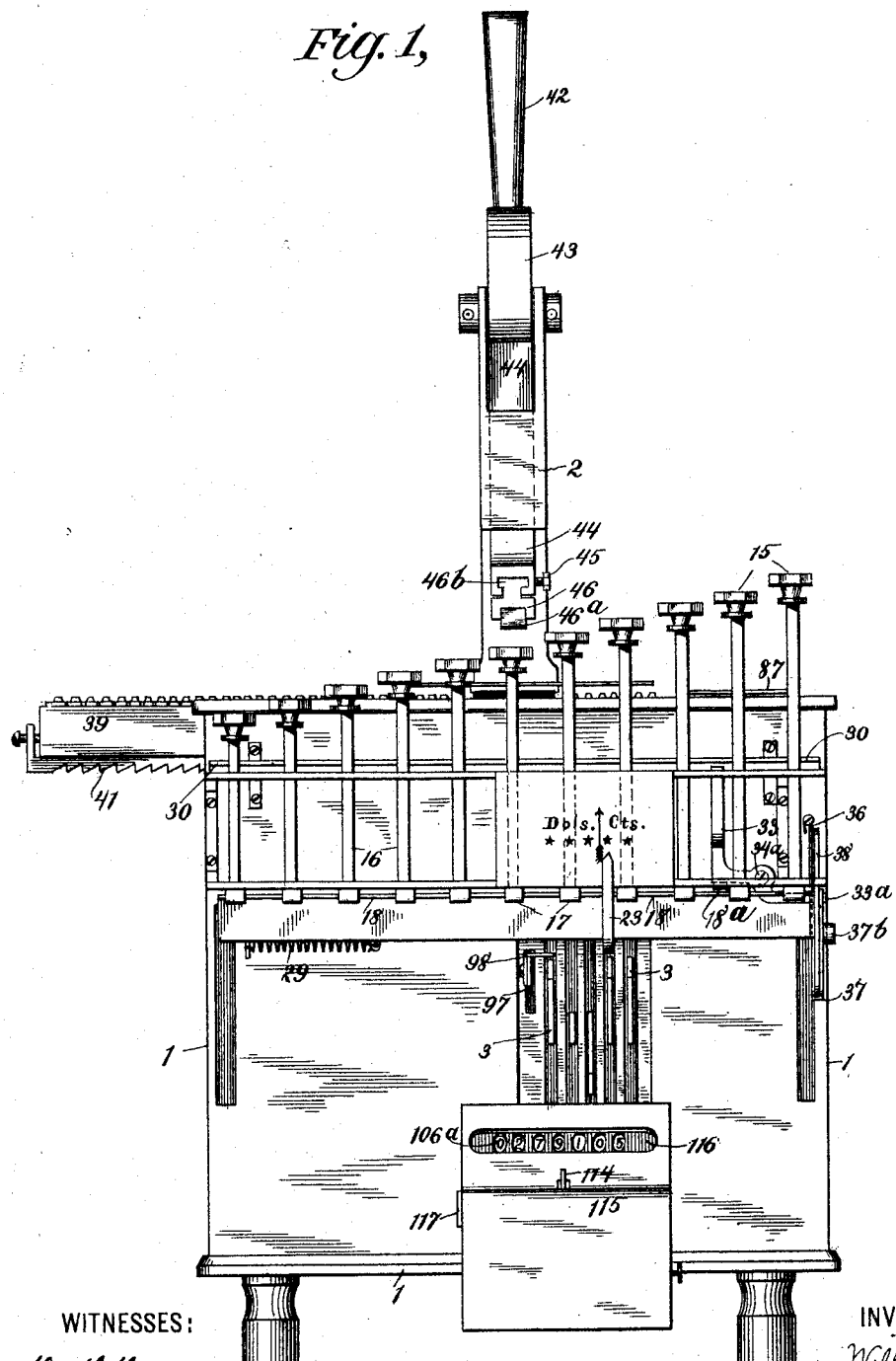

No. 617,560. Patented Jan. 10, 1899.
W. LE G. BUNDY.
TYPE WRITING AND ADDING MACHINE.
(Application filed May 27, 1898.)
(No Model.) 7 Sheets—Sheet 5.

WITNESSES
INVENTOR
Willard Le Grand Bundy
BY Wetter & Kenyon
ATTORNEYS

No. 617,560. Patented Jan. 10, 1899.
W. LE G. BUNDY.
TYPE WRITING AND ADDING MACHINE.
(Application filed May 27, 1898.)
(No Model.) 7 Sheets—Sheet 6.
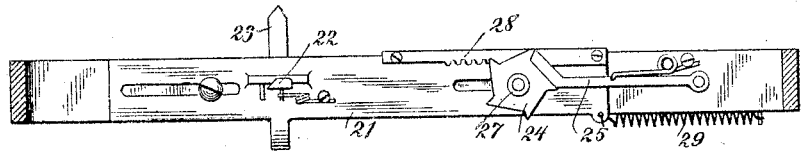
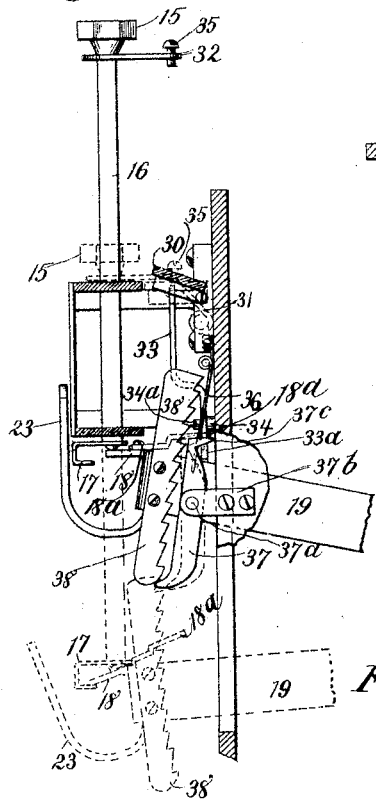
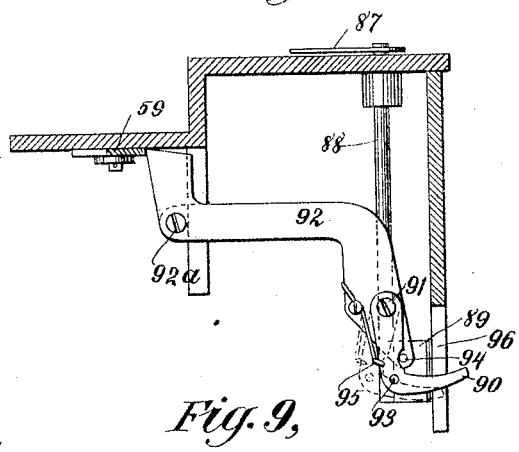
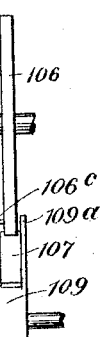
WITNESSES:
INVENTOR
Willard Le Grand Bundy
BY
Witter & Kenyon
ATTORNEYS No. 617,560. Patented Jan. 10, 1899.
W. LE G. BUNDY.
TYPE WRITING AND ADDING MACHINE.
(Application filed May 27, 1898.)
(No Model.) 7 Sheets—Sheet 7.
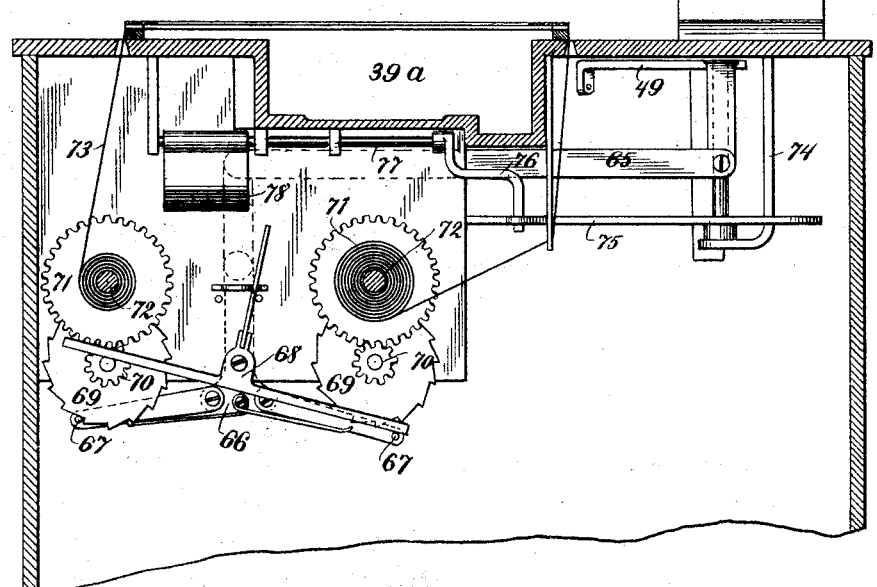
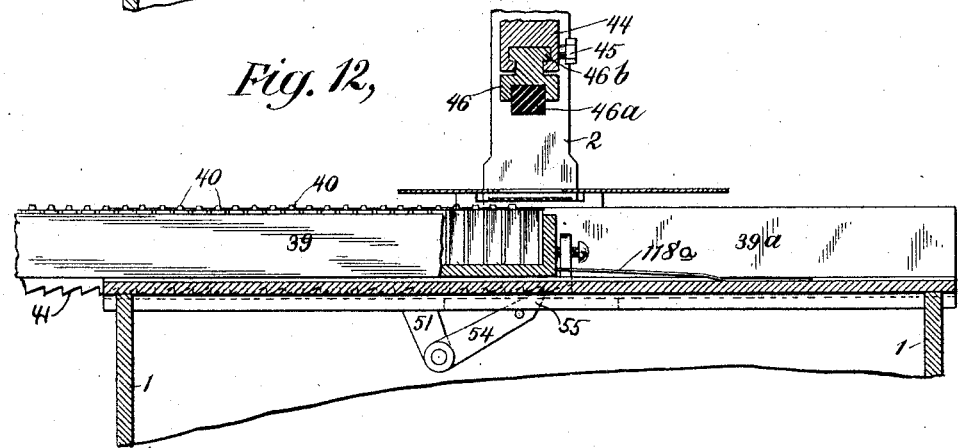
WITNESSES:
INVENTOR
Willard Le Grand Bundy
BY
Witter + Kenyon
ATTORNEYS

UNITED STATES PATENT OFFICE.

WILLARD LE GRAND BUNDY, OF BINGHAMTON, NEW YORK, ASSIGNOR TO
THE BUNDY MANUFACTURING COMPANY, OF NEW YORK.

TYPE-WRITING AND ADDING MACHINE.

SPECIFICATION forming part of Letters Patent No. 617,560, dated January 10, 1899.

Application filed May 27, 1898. Serial No. 681,889. (No model.)

*To all whom it may concern:*

Be it known that I, WILLARD LE GRAND BUNDY, a citizen of the United States, and a resident of Binghamton, in the county of Broome, State of New York, have invented certain new and useful Improvements in Type-Writing and Adding Machines, of which the following is a specification.

My invention relates to that class of machines in which type are carried upon disks or wheels or other suitable type-carrying mechanism and are brought upon a printing or adding line by the manipulation of keys for the purpose of printing therefrom or to disclose the total sum of the numbers added.

It has for its objects to increase the efficiency of such machines, to decrease the number of keys required to operate the disks or wheels or other type-carrying mechanism, and generally to simplify and improve the construction and operation of such machines; and it consists of the devices herein shown and described.

Heretofore it has generally been found necessary in machines of the kind to which my invention relates to employ a large number of keys and wheels to commence the type-setting or the adding at the units place, proceeding thence to the left to higher orders in regular sequence. By means of my improved device only ten type-setting keys, which will hereinafter be designated as "type-keys," are needed, no matter how large the numbers to be printed or added, and the type-setting and adding are begun at the highest order of figures in the number to be printed or added and proceed to the right in the normal manner of reading numbers. Only one series of adding-wheels are required and the adding may begin upon any adding-wheel representing any order of figures, such wheel adding and carrying to the left without affecting any of the adding-wheels to its right representing lower orders of figures.

My improved device may be used either as a printing or recording machine alone—as, for example, for the purpose of setting type to print the amounts of a pay-roll or as an adding-machine alone, or as both combined. In the latter case the machine is manipulated by the same set of keys used for either of the separate purposes alone.

Figure 3:
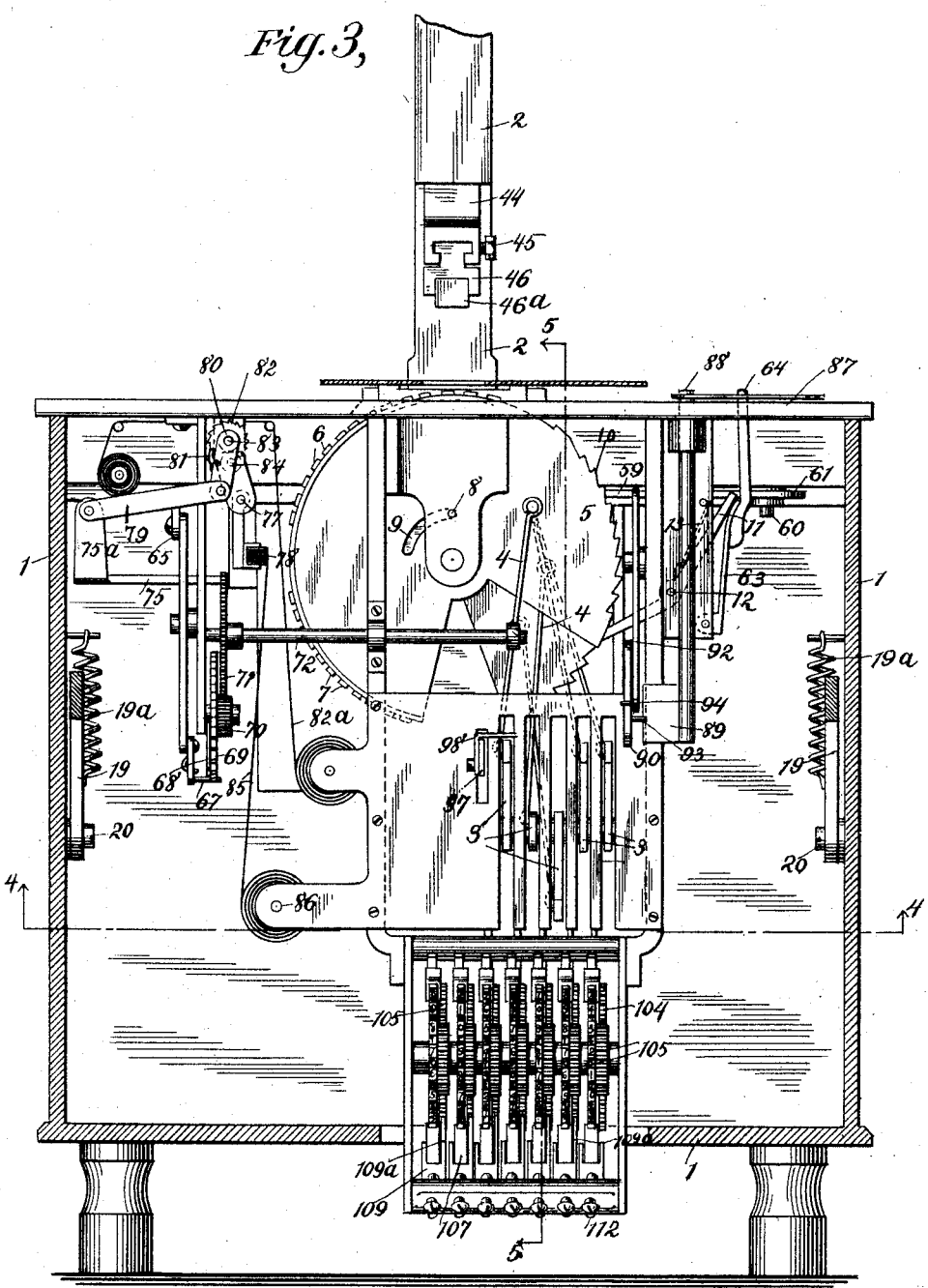

The general operation of certain parts of the preferred form of my device is as follows: The ten type-keys 15 15 represent the digits from "0" to "9," inclusive. By depressing any one of these type-keys one of a series of type-carrying mechanisms—as shown in the drawings type-carrying disks 5—is rotated so as to bring upon a printing line or lines type representing the number of the type-key depressed. In the form shown in the drawings these type-carrying disks carry two sets of type 6 and 7, each set being the duplicate of the other. One set 6 are brought upon a printing-line at the top of the machine, as shown in Fig. 3, for the purpose of printing, preferably, upon a removable piece of paper. For this purpose an inking-ribbon 73 (see Figure 5) and impression mechanism actuated by the handle 42, Fig. 1, are provided. The other set 7 are brought opposite a platen 78 and by means of an inking-ribbon 85 print upon a permanent recording-strip $82^a$ within the interior of the machine. The two records as far as concerns the matter printed by the type of the disks are of course exact duplicates.

By mechanism hereinafter to be described, a series of adding-wheels 106 (see Fig. 5) are rotated as the type-keys 15 are depressed, the number represented by any type-key depressed being added by the adding-wheels, the total of the numbers added being visible at all times through an opening 116 in the casing 115 of the machine, and, if desired, the total may at any time be printed upon a piece of paper by means of mechanism hereinafter to be described.

In depressing the type-keys to print or add any number the type-key representing the figure of highest order or value in the said number is first depressed, then the type-key representing the figure of next lower order, and so on. Thus to print or add "$75.95" that one of the type-keys 15 which bears the number "7" is first depressed, then the one bearing the number "5," then "9," and then "5" again.

By means of a finger or presser (in the drawings shown as presser 22) intervening between the type-keys and the type-carrying mechanism and adapted to be operated by each of the type-keys and when operated by the keys to actuate successively the type-carrying mechanisms the type represented by the type key or keys struck are brought upon a printing or adding line. I am thus enabled to dispense with the large number of type-keys heretofore ordinarily employed in machines of this character and am enabled to operate my machine by means of ten type-keys only.

The drawings which form part hereof represent the preferred form of my improved device, which I will now proceed to describe.

Figure 2:
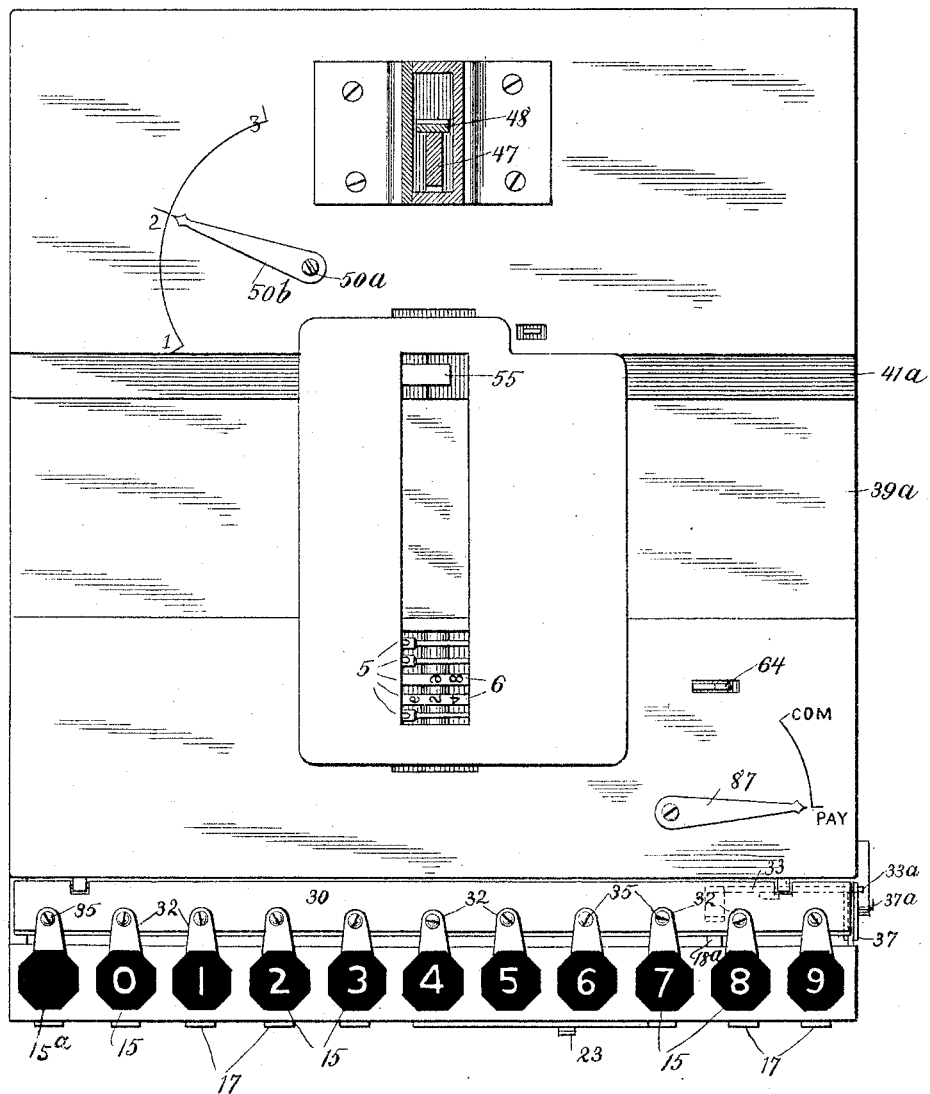
Figure 4:
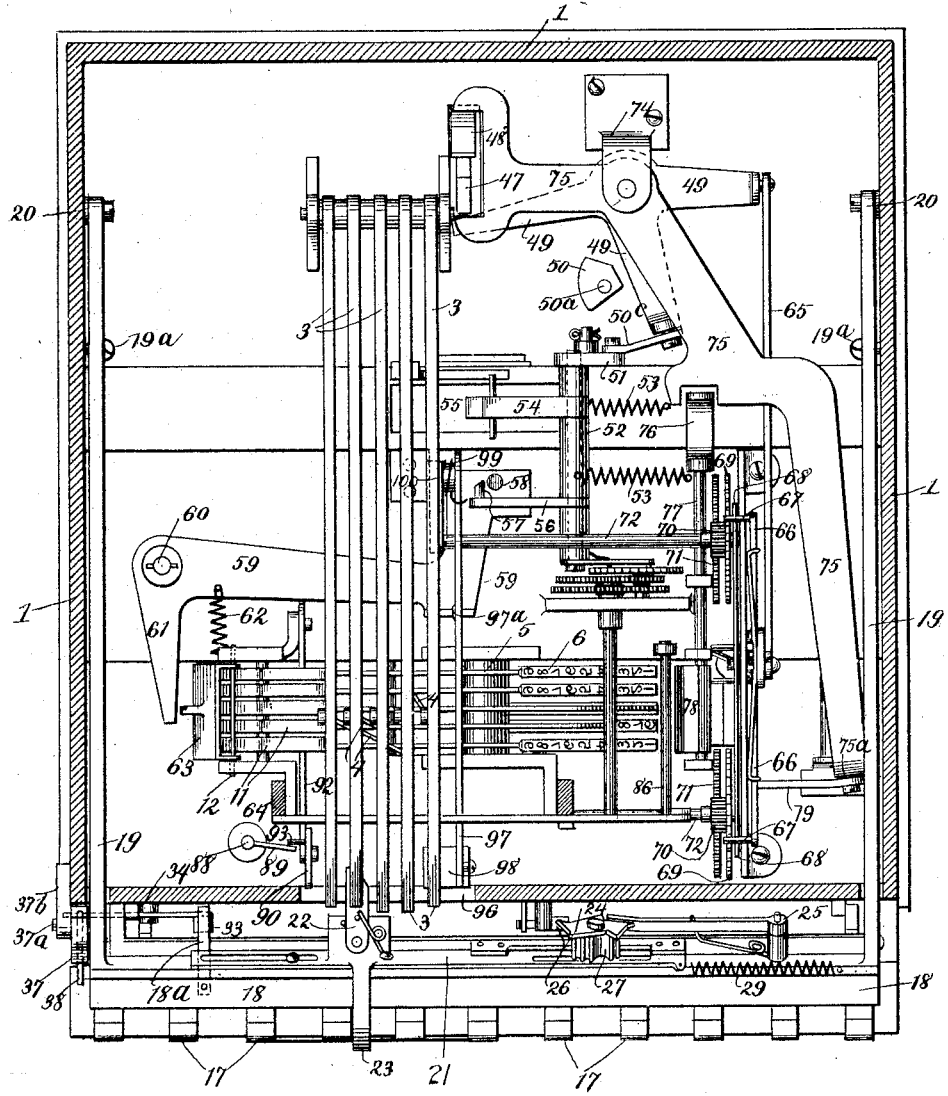
Figure 5:
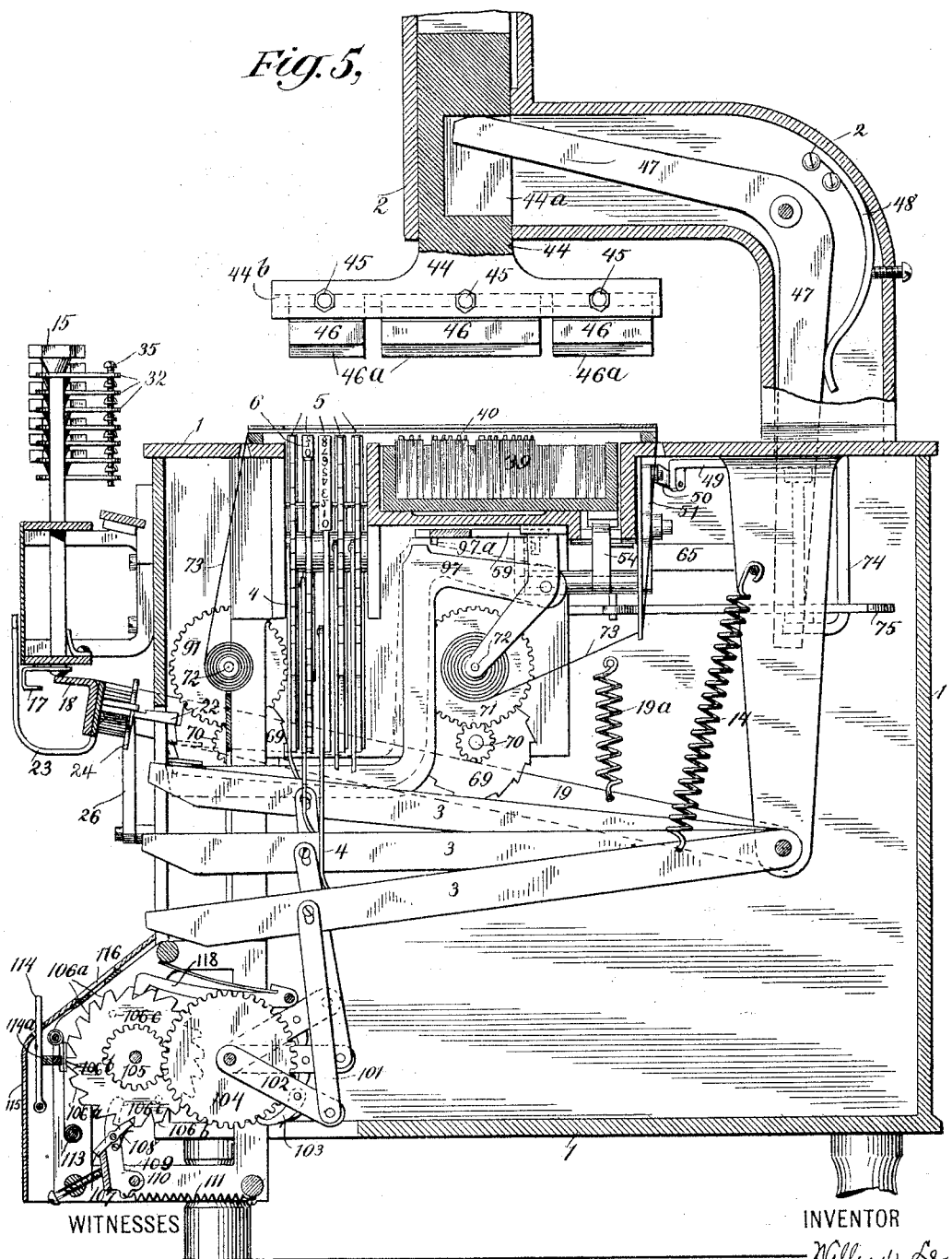

Fig. 1 is a front elevation of my improved device. Fig. 2 is a plan with the handle and certain connecting mechanism removed. Fig. 3 is a front elevation with the face-plate and certain parts removed. Fig. 4 is a plan viewed from the bottom, as indicated by the lines 4 4 of Fig. 3, with the adding mechanism omitted. Fig. 5 is a vertical elevation on the lines 5 5, Fig. 3. Fig. 6 is a vertical elevation of the presser, its movable carriage, and certain connecting parts as viewed from the rear. Fig. 7 is a side view, partly in section, of one type-key and connecting parts. Fig. 8 is a detail of one form of the mechanism for releasing the type-carrying disks. Fig. 9 is a perspective view of one of said disks. Fig. 10 is a detail view of the adding-wheels and their carrying mechanism. Fig. 11 is a detail view of part of the inking mechanism, and Fig. 12 is a vertical cross-section through the platen and type-form carriage.

1 is the casing of my improved machine.

2 is an upward extension of the casing to hold the handle 42 and connections and parts of the impression mechanism.

The type-carrying mechanisms for carrying and bringing the type upon the printing or adding line are represented in the drawings as type-bearing disks or wheels. Other suitable forms of type-carrying mechanism may, however, be employed, if desired. These disks or wheels consist of the type-carrying disks 5 and adding-wheels 106.

3 are levers for operating the type-carrying disks and adding-wheels, and for the sake of brevity they will be hereinafter designated as "operating-levers." There are five of these operating-levers, as shown in the drawings; but a greater or smaller number may be employed, as desired. They represent the different orders of figures in the numbers to be printed or added. Rods 4, pivoted to the operating-levers and to the type-carrying disks 5, connect the said levers and disks together. Each of the disks 5 has upon its periphery two sets of type 6 7, each set representing digits "0" to "9," inclusive, and both sets being exactly alike. When an operating-lever 3 is depressed, its corresponding type-carrying disk 5 is rotated so as to bring one of the digits in the set of type 6 upon the printing-line at the top of the machine and the same digit in the other set 7 upon the printing-line opposite to platen 78. The particular digit which is thus brought upon the printing-lines depends upon the length of throw of the operating-lever and arm 4 and the consequent extent of rotation of the disk 5. This is under the control of the operator, as will be hereinafter described. Pin 8, projecting into slot 9 in said disks, acts as a stop to prevent excessive rotation of the disks. Type-carrying disks 5 have also upon another portion of their peripheries a series of teeth 10. Into these take pawls 11 for the purpose of locking the disks in any particular position against the action of springs 14, Fig. 5, which tend to raise operating-levers 3 and rotate type-carrying disks 5 into their normal position. Each pawl 11 is pivoted at its center 12 (see Fig. 3) and is normally pressed into contact with teeth 10 by means of springs 13. After a disk has been rotated so as to bring any digit upon the printing-lines it is held locked in that position by one of the pawls 11 until these pawls are removed from contact with teeth 10 in any one of the manners hereinafter described.

The type-keys 15 for operating levers 3 are ten in number, and each one bears a number, the numbers running from "0" to "9," inclusive, as shown in Fig. 2. In addition to these there is another key 15$^a$, which will hereinafter be spoken of as the "spacing-key." It bears no number, and its function and mode of operation will be hereinafter described. These type-keys 15 and spacing-key 15$^a$ have each a shank 16, (see Fig. 1,) a hook 17, and a projection 32.

18 is a rocking bar supported by arms 19 on each side of the machine, the latter being pivoted to the framework at 20. (See Fig. 4.) This rocking bar will hereinafter be spoken of as the "key-bar." The shank 16 of any of the keys 15 and 15$^a$ when the latter are depressed (shown by dotted lines in Fig. 7) strike against and force down key-bar 18, the hook 17 catching under the key-bar.

21 is a movable carriage. It is mounted upon the rear part of key-bar 18, approximately near the center of the latter, and the two are adjustably secured together by means of slots in the carriage and a pin projecting from the key-bar and the axle of star-wheel 24 and gear-wheel 27, the pin and axle passing through the slots, as shown in Figs. 4 and 6. By means of these connections movable carriage 21 can be moved sidewise to the right or left along key-bar 18. Movable carriage 21 carries a presser 22 and an index-finger 23. The former projects over the ends of operating-levers 3, and when key-bar 18 is depressed by any of the type-keys 15 the presser 22 strikes and presses down one of the operating-levers 3, whichever one of the said levers it happens to be over at the time.

Motion sidewise is imparted to carriage 21 by the following mechanism: A star-wheel 24 is secured to key-bar 18 and is prevented from backward rotation by a spring-pressed pawl 25. A hook 26 is secured to the framework of the machine. As the star-wheel rises after each depression of the key-bar 18, one of its teeth strikes against the hook, and the star-wheel is thus rotated one tooth. To the star-wheel is secured a gear-wheel 27, which engages rack 28, attached to carriage 21. Each time key-bar 18 is depressed by any one of the keys the star-wheel rotates one tooth and, through the gear-wheel and rack, drives carriage 21, presser 22, and index-finger 23 one point to the right, thus bringing presser 22 over the next operating-lever 3 to the right. One portion of gear-wheel 27 has no teeth, as shown in Fig. 4, where said portion appears turned away from the rack. This portion is so arranged that it will face rack 28 just as the presser and index-finger rise after they have been depressed in their position at the extreme right or in the unit position. As in this portion of gear 27 there are no teeth to catch into the teeth of rack 28, spring 29 at once hauls carriage 21, with presser 22 and index-finger 23, back to their original positions ready for another operation of the machine. Thus by depressing any one of the type-keys 15 a sufficient distance key-bar 18 will be depressed, carrying with it carriage 21, star-wheel 24, and presser 22, the latter forcing down one of the operating-levers 3, and thereby rotating its corresponding type-carrying disk 5 until one of its digits is brought upon both printing-lines, at which point the type-carrying disk will be held locked by its pawl 11, star-wheel 24 being rotated one tooth upon its subsequent upward movement, thus moving presser 22 to the right over the next operating-lever in order. If another type-key 15 is then depressed, the said next operating-lever 3 will be moved in the same manner, and so on, the presser 22 moving one point to the right at each depression of a key until it stands over the unit-operating lever. At the next depression of a key the presser after depressing the said unit-operating lever will be at once returned to its normal position at the extreme left of its range of movement ready for the printing or adding of the next number.

The object of the spacing-key 15ª is to cause carriage 21 and the presser 22 to move to the right without, however, operating the presser 22 until the presser is over the proper lever to begin the printing. For this purpose the throw of spacing-key 15ª is not long enough to cause the presser 22 to reach any of the operating-levers 3. It is long enough, however, to depress key-bar 18 sufficiently to bring star-wheel 24 below hook 26, and thus to rotate the star-wheel 24 and move carriage 21 and presser 22 one point to the right. The operation is as follows: Spacing-key 15ª is pressed down once, twice, or more times until presser 22 stands over the operating-lever representing the order of figures corresponding with the figure of the highest order or value in the number to be printed or added. Thus, for instance, if it is desired to print or add the number "765" spacing-key 15ª would, with five operating-levers, as shown in the drawings, be operated twice. Then the type-key 15, bearing the number "7," would be operated. Then the type-keys 15, bearing the numbers "6" and "5," would be successively depressed. Any one of the type-keys 15 can thus, by means of spacing-key 15ª and presser 22, be made to set its number for printing at any order of figures, either the units' order or the tens' or the hundreds' or at any other order desired. In order to insure that each type-key 15 shall bring upon the printing-lines its proper figure borne upon the type-carrying disks and no other figure, I have devised the following mechanism: The type-keys are so arranged (see Figs. 1 and 7) that each has a different depth of throw from every other type-key, and thus when fully depressed each type-key will bring upon the printing-lines a different figure (its own appropriate number) from that of every other type-key when fully depressed. Frame 30ª acts as a stop for key 15, the upper and larger part of the key striking against the frame to prevent the key from being depressed too far. After any key has been partly depressed it cannot be released or raised, and no other key can be operated until the first-mentioned key has been depressed to its fullest extent. This is accomplished by means of a locking-rack and pawls, (one secured to the framework of the machine and the other connected with the type-key on the key-bar 18,) so that as the key-bar 18 is depressed by a key it and the key will be restrained from upward movement and no other key can be operated until the full stroke of the key is made, when the key or key-bar will cause the pawl to be disengaged from the rack, whereupon the parts will be returned to their original positions and any key will be free to operate. My preferred form of such locking devices will be now described.

Shelf 30 is pivoted along one edge, its free edge being normally raised by spring 31, as shown in Fig. 7. When a key is fully depressed, the lower point of screw 35, mounted in a projection 32 from the key, strikes the free edge of shelf 30, depressing it and forcing it downward against lever 33. This lever is fulcrumed upon pin 34 and has a toe 33ª at its lower end.

37 is a pawl pivoted at 37ª in piece 37ᵇ, secured to the framework of the machine. Its upper end is pressed toward the framework by spring 36, so as normally to hold the pawl in contact with the teeth of rack 38, secured to key-bar 18. Accordingly when key-bar 18 is depressed by a key pawl 37 will prevent key-bar 18 from rising, and the latter, through the engagement of hook 17 with it, will prevent the key from being raised. By the time the key has made its full stroke, however, screw 35 strikes shelf 30, depressing lever 33 and throwing its toe 33ᵃ upward against finger 37ᶜ of pawl 37, thus withdrawing pawl 37 from engagement with rack 38 and permitting springs 19ᵃ to raise arms 19, key-bar 18, and the key to their normal positions. The next key in order can now be operated. Screws 35 are adjustable, so as to counteract any differences that may exist in the lengths of the strokes of the different keys, thus permitting of delicate and accurate adjustment for each key.

By means of adjustable screw 34ᵃ enough friction is maintained between lever 33 and the shoulders of pin 34 to keep the lever in any position in which it is placed and prevent it from moving until positively moved, as downward, by shelf 30 to release the pawl or upward by the action of piece 18ᵃ, which is secured to and projects backward from key-bar 18 under the left-hand member of lever 33, as seen in Fig. 1. When the key-bar rises, piece 18ᵃ strikes against the left-hand member of lever 33 and forces it upward into its original position, ready for the next operation, and withdrawing its toe 33ᵃ from contact with finger 37ᶜ of pawl 37.

A groove or depression 39ᵃ, Fig. 2, is made in the top of the machine alongside of the type 6 on the type-carrying disks for the insertion of other type or printing matter. As shown in the drawings, Fig. 1, a type-form carriage 39 is inserted in this groove, provided with a type-form 40, containing, for example, a list of the names or numbers, or both, with the rate per piece or per day for a pay-roll, opposite to which the amounts of the different salaries are to be printed by the type 6 on the type-carrying disks.

41 is a rack secured to carriage 39 and moving in slot 41ᵃ for the purpose of imparting intermittent motion to the carriage through a tooth 55 of oscillating arm 54, Fig. 4, in a manner presently to be described.

The impression mechanism (shown in the drawings) for causing an imprint to be taken of the type 6 upon the type-carrying disks and the type 40 on carriage 39 is as follows: A handle 42, Fig. 1, having a cam-surface 43, is pivoted in part 2 of the framework, 44 being a piece working loosely inside of frame 2. This piece 44 carries the platen or impression surface 46ᵃ. It has a recess 44ᵃ, into which projects one end of lever 47, (see Fig. 5), for purposes hereinafter to be described. Through handle 42 and piece 44 the platen is forced downward against the paper, ink-ribbon, and type upon the printing-line at the top of the machine. As at times it may be desired not to print all of the three items of names, rates, and totals, but to omit one or two of them, I have arranged my platen-surfaces so as to be variable in width at the option of the operator, depending upon whether one or more of the above items are to be omitted. For this purpose I have shown my platen as composed of three separate sections, as shown in Fig. 5, each section having a separate platen-holder 46. Each platen-holder has a T-shaped portion 46ᵇ in cross-section in its upper part and is adapted to fit into and to slide in a corresponding T-shaped groove 44ᵇ in the lower part of piece 44. Each is secured in place in the groove by means of a screw 45. By the above means any one or more of the sections of the platen can readily be inserted and used or be easily removed. A much cleaner impression is thus made upon the paper where the entire width of the platen is not used, inasmuch as a platen that is wider than the printing-line is apt to smut or blur the paper.

Lever 47 is pivoted in framework 2. Its upper arm projects into a recess in shaft 44, while its lower arm projects downward into the interior of the frame 1. Its object is to impart motion to various parts of the interior mechanism of the machine—viz., the mechanism for feeding forward carriage 39, for releasing the type-carrying disks by withdrawing pawls 11, and for actuating the platen and feeding the inking-ribbon and paper strip of the impression mechanism in the interior of the machine. This is accomplished by the following-described mechanism:

Spring 48 keeps lever 47 normally in the position shown in Fig. 5. The lower arm of lever 47 bears against the three-armed lever 49 and lever 75, Fig. 4. When handle 42 is pulled downward, the lower end of lever 47 is forced toward the back of the machine against the pressure of spring 48, pushing back levers 49 and 75. When handle 42 is raised, spring 48 forces lever 47 forward, and with it levers 49 and 75. The middle arm of lever 49 imparts motion to the devices for feeding forward carriage 39 and for releasing the type-carrying disks.

50 is a three-sided cam-piece for regulating the extent of throw of lever 49. It is mounted upon pin 50ᵃ, to which is also secured index-finger 50ᵇ, Fig. 2, by which the cam is shifted from one to another of its three positions. The three sides of the cam when turned successively toward the middle arm of lever 49 lie at different distances from that arm, thus permitting carriage 39 to be fed a shorter or longer distance, as desired.

50ᶜ is a rod pivotally connected to the end of the middle arm of lever 49 and to rod 51, mounted on shaft 52. Springs 53 tend to retract shaft 52.

54 is an oscillating arm mounted on shaft 52 and having a tooth 55, adapted to take into the teeth of rack 41. As lever 49 is moved backward and forward by the operation of handle 42 shaft 52 and arm 54 are rocked back and forth, and tooth 55 intermittently feeds forward rack 41 and carriage 39. Shaft 52 has also another arm 56 secured to it, carrying pin 57. This pin engages with pin 58 on lever 59, pivoted at 60. The further end 61 of the lever 59 is adapted to bear upon a swinging arm 63, (when operated against the pressure of spring 62,) and arm 63 is adapted to press upon the upper end of pawls 11 to release the type-bearing disks 5. In one part of its rocking motion pin 57 of arm 56 presses against pin 58, and thereby forces arm 61 of lever 59 against swinging arm 63 and the latter against pawls 11 to free them from engagement with the type-carrying disks. Thus at each operation of the handle the type-carrying disks 5 and operating-levers 3 are released and through the operation of springs 14 are returned to their normal positions.

64 is a lever projecting through the top plate of the machine, adapted to be operated by hand and pivoted so that its lower end may be made to press upon swinging arm 63 and thus release the type-carrying disks from engagement with pawls 11.

Secured to the third arm of lever 49 is a rod 65. The latter is connected to and rocks a spring-pressed rock-bar 66, having a pin 67 at each end adapted to mesh into the teeth of ratchet-wheel 69, as clearly shown in Fig. 11. By means of the bar 68, pivoted at its center, one or the other of these pins is held out of engagement with its ratchet-wheel and the other is held in engagement with its ratchet-wheel. As pin 67 rocks through the reciprocal action of lever 49 and rod 65 it feeds forward ratchet-wheel 69. The latter, through gear-wheel 70, mounted on its shaft, drives gear-wheel 71 and winds inking-ribbon 73 upon shaft 72 or unwinds it. By changing the position of bar 68 the direction of the feed of this ink-ribbon can be changed. The position of the bar 68 can be changed by hand whenever it is desired to feed the ribbon in the opposite direction. The ink-ribbon 73 runs from shaft 72 over the printing-line at the top of the machine to enable an impression to be taken at that point.

Lever 75 is mounted in standard 74. In its backward and forward motion it rocks an arm 76, mounted upon a rock-shaft 77. Upon this shaft is also mounted an arm and platen 78. When the platen is swung forward, it presses paper strip 82ª and inking-ribbon 85 against type 7 of type-carrying disks 5 and causes an impression to be taken of the said type upon the printing-line. Thus upon the paper strip 82ª a permanent record is made corresponding to that printed upon the removable slips at the printing-line on the top of the machine. Lever 75 has at its farther end an arm 75ª, which, through rod 79, rocks bar 80 back and forth. As it thus rocks pawl 81 rotates ratchet-wheel 82 tooth by tooth, feeding forward the paper strip 82ª. A roller 83, mounted on the same shaft as ratchet-wheel 82, presses against roller 84, upon which inking-ribbon 85 is wound, and thus feeds the inking-ribbon forward from spool 86. The particular means for feeding the ink-ribbons and paper strip form no part of my invention and are accordingly not given in full detail. The parts of the paper strip and ink-ribbon and their feeding devices, which are shown in the drawings, are intended more to show the location and general arrangement of such parts than to show the parts in full or in detail. Some parts of the feeding devices, therefore, are omitted for the sake of clearness, the said devices forming no part of my present invention. Any suitable means may be employed for that purpose without departing from the spirit of my invention.

Another device for automatically tripping pawls 11, and thus releasing the type-carrying disks and operating-levers, is shown in Fig. 8. This device is employed when handle 42 is not used. 87 is a movable index-finger upon the top plate of the machine, mounted upon a rod 88. Rod 88 also carries a flange 89 at its lower end. 92 is a bell-crank lever pivoted at 92ª in the framework of the machine and having a stop-pin 94 at its lower end and at its other end bearing against lever 59. A toe 90, loosely pivoted to lever 92 at 91, is pressed by spring 95, so that its outer end projects outward through an opening 96 in the front plate of the machine. It also has a pin 93 projecting on one side, with which flange 89 may engage. When index-finger 87 is turned into the position occupied by it in Figs. 2 and 4, marked "Pay" in Fig. 2, (which is done when handle 42 is in use,) the flange 89, through pin 93, pushes toe 90 backward into the position shown in dotted lines in Fig. 8. In this position toe 90 does not project beyond the face-plate and is withdrawn from operation. Whenever handle 42 is not in use—for example, when the machine is used simply for adding and not for printing at the top printing-line—finger 87 is turned into the position marked "Com" in Fig. 2, in which position flange 89 is removed from contact with pin 93, whereupon toe 90 at once projects beyond the face-plate. In this position toe 90 will lie in the upward path of a portion of movable carriage 21 as it rises after the unit or last operating-lever has been operated and will be forced upward, carrying with it, through stop 94, lever 92 and forcing back lever 59, and thus, through arm 61 of that lever and swinging arm 63, tripping the pawls 11 and releasing type-carrying disks 5 and operating-levers 3, which at once return to their normal position ready for the adding of the next number.

In order that swinging arm 63 shall be held by lever 59 61 against pawls 11 long enough to insure that disks 5 shall return to their original positions, a locking-lever 97 is provided. It is pivoted on a shaft 99, turning loosely in plate 100, and is pressed upward by a spring, as shown in Fig. 4, and has a locking-pin 97ª. When lever 59 61 is pressed back to release the type-carrying disks, pin 97ª slips behind lever 59 and holds 61 and 63 against pawls 11. The pin is unlocked in the following manner: Lever 97 projects slightly from the front of the machine alongside of the operating-lever of the highest order, and an arm 98 projects over that lever, so that when the first key is operated in printing or adding a number lever 97 is depressed, locking-pin 97$^a$ is withdrawn from contact with lever 59, the latter is retracted by spring 62, and pawls 11 are free to engage with teeth 10 of disks 5.

The adding mechanism of my improved device in the form shown in the drawings herein consists of the following parts: Pivoted to each of the operating-levers 3 is a rod 101, the latter being pivoted at its other end to an arm 102, which is loosely mounted upon the shaft of gear-wheel 104 and has a pawl 103 engaging with the teeth of gear-wheel 104. Every time the operating-lever 3 is depressed gear-wheel 104 is rotated one or more teeth, dependent upon the extent to which lever 3 is depressed. Gear-wheel 104 meshes with gear-wheel 105, mounted upon the shaft of adding-wheel 106 and having the same number of teeth as the latter wheel. Thus adding-wheel 106 rotates one or more teeth for each operation of operating-lever 3 or its actuating-key, the extent of this rotation depending upon the extent of depression of lever 3 or its actuating-key and is prevented from rotating backward by spring-pressed pawl 118. Each adding-wheel 106, as shown, carries two sets of numerals 106$^a$ and 106$^b$, each set consisting of the digits "0" to "9," inclusive. (The drawings show each wheel as carrying twenty numerals, or from "0" to "9" repeated once.) The set 106$^a$ are placed upon inclined faces of the teeth and are visible through opening 116 in the casing 115 and show at all times the total sum of the numbers added upon the machine. The set 106$^b$ are type and are placed upon the end of the teeth for the purpose of printing. Any means for printing may be employed. As shown in the drawings, it is done by means of a lever 114, platen 114$^a$, and inking-ribbon 113. Whenever it is desired to secure a printed record of the sum, a piece of paper is inserted opposite the platen and the handle is pressed. The type 106$^b$ are so arranged that the same number appears opposite platen 114$^a$ that appears as 106$^a$ at opening 116.

The carrying mechanism consists of the following parts: A pin 106$^c$ for each ten teeth projects from the side of each adding-wheel toward the adding-wheel of the next higher order. 109 is a rocking piece (one for each adding-wheel) loosely mounted upon shaft 110, held upright by spring 111, and bearing a pawl 107, pressed upward by spring 108, and also having a finger 109$^a$. The pawl 107 engages with the teeth of the adding-wheel and gives as the wheel is rotated. When any adding-wheel has been rotated ten teeth, its pin 106$^c$ strikes finger 109$^a$ and depresses piece 109 and pawl 107, thus positively feeding the adding-wheel of higher order forward one tooth. Rocking piece 109 is then retracted by spring 111 to its original position.

It is absolutely necessary when printing the amounts of pay opposite to the names of the operatives upon the type-form 40 that the operator make the amounts set up by him upon the type-disks register accurately with the proper names in type upon the type-form. In order to effect this with certainty and without trouble, I place a spring-stop 118$^a$ at such a point in groove 39$^a$ that when the type-form carriage 39 strikes against it the carriage will be in such a position that upon the actuation of the hammer-impression mechanism the first line of type upon the type-form will be brought upon the printing-line. In this way an accurate register can always be maintained without difficulty.

By my improved device only one series of adding-wheels is needed. Adding may be commenced upon any adding-wheel, and the adding will proceed from that wheel to wheels of higher order without affecting in any way the wheels of lower order. One adding-wheel is employed for each operating-lever, and as many more may be used as desired.

As many operating-levers 3 may be used as may be found desirable without necessitating any increase in the number of keys.

The type disks and wheels or other type-carrying mechanism may be operated by the presser through any suitable connecting mechanism, my invention not being restricted to the use of operating-levers for this purpose. Many other changes also may be made in the apparatus shown and described herein without departing from my invention.

The type-carrying mechanism—viz., disks 5 and adding-wheels 106—represent different numerical orders, one disk and wheel representing units, the next disk and wheel tens, and so on.

What I claim as new, and desire to secure by Letters Patent, is—

1. The combination of type-carrying mechanisms representing different numerical orders, a presser adapted to actuate successively the type-carrying mechanisms of different orders, and keys, adapted to operate the presser to cause it to actuate the type-carrying mechanisms to bring upon the printing or adding line the type represented by the different keys operated.

2. The combination of type-carrying mechanisms representing different numerical orders, a traveling presser adapted to register with and to actuate successively the type-carrying mechanisms of different orders, and keys, adapted to operate the presser to cause it to register with and to actuate successively the type-carrying mechanisms to bring upon the printing or adding line the type represented by the different keys operated.

3. The combination of type-carrying mechanisms, each representing a fixed numerical order, the same order at all times and different from the order of each of the other type-carrying mechanisms, a presser adapted to actuate successively the type-carrying mechanisms of different orders, and keys adapted to operate the presser to cause it to actuate the type-carrying mechanisms to bring upon the printing or adding line the type represented by the different keys operated.

4. The combination of type-carrying mechanisms representing different numerical orders, operating-levers for actuating the type-carrying mechanisms, a presser adapted to actuate successively the operating-levers, and keys for operating the presser, whereby type upon the type-carrying mechanism, forming the number represented by the digits upon the key operated, will be brought upon the printing or adding line.

5. The combination of type-carrying disks or wheels, operating-levers for rotating said disks or wheels, a traveling presser adapted to actuate successively the operating-levers, and keys for operating the traveling presser, whereby type upon the type disks or wheels, forming the number represented by the digits upon the keys operated, will be brought upon the printing or adding line.

6. The combination of type-carrying mechanisms, each representing a fixed numerical order, the same order at all times and always different from the order of each of the other type-carrying mechanisms, a presser adapted to actuate successively the type-carrying mechanisms of different orders, a spacing-key for causing the type-carrying mechanism of any desired order to register with the presser, and type-keys for operating the presser to cause it to actuate successively type-carrying mechanisms of different orders to bring upon the printing or adding line the type represented by the different keys operated.

7. The combination of type-carrying mechanisms representing different numerical orders, a traveling presser adapted to register with and to actuate successively the type-carrying mechanisms of different orders, a spacing-key for placing the traveling presser in proper position, and keys, adapted to operate the presser to cause it to register with and to actuate successively, the type-carrying mechanisms to bring upon the printing or adding line the type represented by the different keys operated.

8. The combination of type-carrying disks or wheels, operating-levers for rotating said disks or wheels, a traveling presser adapted to actuate successively the operating-levers, a spacing-key for placing the traveling presser in proper position, and type-keys for actuating the presser to cause it to move the proper operating-levers.

9. The combination of type-carrying mechanisms representing different numerical orders, a traveling presser adapted to register with and to actuate successively the type-carrying mechanisms of different orders, a key-bar, type-keys each adapted to actuate the key-bar to operate the traveling presser, whereby the number represented by the digits upon the type-keys depressed by the operator, will appear in the type of the type-carrying disks upon the printing or adding line.

10. The combination of type-carrying mechanisms representing different numerical orders, a traveling presser adapted to register with and to actuate successively the type-carrying mechanisms of different orders, a spacing-key for placing the traveling presser in proper position, a key-bar, type-keys each adapted to actuate the key-bar to operate the traveling presser whereby the number represented by the digits upon the type-keys depressed by the operator, will appear in the type of the type-carrying disks upon the printing or adding line.

11. The combination of type-carrying disks or wheels, operating-levers for rotating said disks or wheels, a traveling presser adapted to actuate successively the operating-levers, a key-bar, adapted to be actuated by all the keys to operate the traveling presser, a spacing-key and type-keys, whereby the number represented by the digits upon the type-keys depressed by the operator, will appear in the type of the type-carrying disks upon the printing or adding line.

12. The combination of type-keys, a spacing-key, a key-bar, adapted to be moved by all the keys, a carriage mounted upon the key-bar, means for moving said carriage along the key-bar, a presser upon said carriage, a series of operating-levers, with each of which the presser is adapted in turn to engage when the key-bar is moved by the type-keys and the type-carrying disks adapted to be rotated by the operating-levers whereby the number represented by the digits upon the type-keys depressed by the operator, will appear in the type of the type-carrying disks upon the printing or adding line.

13. The combination of type-keys, a spacing-key, a key-bar, adapted to be moved by all the keys, a traveling carriage, means for moving said carriage adapted to be actuated by the depression of any key, a presser upon said carriage, type-carrying mechanisms representing different numerical orders which the presser is adapted to successively register with and to actuate, whereby the number represented by the digits upon the type-keys depressed by the operator, will appear in the type of the type-carrying mechanisms upon the printing or adding line.

14. The combination of type-keys, a spacing-key, a key-bar, adapted to be moved by all the keys, a carriage mounted upon the key-bar, means for moving said carriage along the key-bar, a presser upon said carriage, a series of operating-levers, with each of which the presser is adapted in turn to engage when the key-bar is moved by the type-keys and type-carrying disks adapted to be rotated by the operating-levers, means for holding said disks in set position and means for releasing and returning the disks and operating-levers to their normal position.

15. The combination of type-keys, a spacing-key, a key-bar, adapted to be moved by all the keys, a carriage mounted upon the key-bar, means for moving said carriage along the key-bar, a presser upon said carriage, a series of operating-levers, with each of which the presser is adapted in turn to engage when the key-bar is moved by the type-keys, and type-carrying disks and adding-wheels, both adapted to be rotated by the operating-levers, whereby the number represented by the digits upon the type-keys, depressed by the operator, will appear in the type of the type-carrying disks and wheels upon the printing and adding line.

16. The combination with type-carrying mechanisms, operating-levers for actuating said mechanism, a presser and keys, of a rocking key-bar and a projecting hook upon the stem of each key, whereby, when one key has commenced to operate the machine, all of the other keys are prevented from operating it until the said first-mentioned key and the said key and presser have returned to their normal positions.

17. The combination, with type-carrying mechanism, a presser for actuating the same, a key-bar for operating the presser and keys for moving the key-bar to cause it to operate the presser, of a rack upon the key-bar, a pawl upon the framework of the machine adapted to engage with said rack when a key is depressed to lock the key-bar and key and mechanism adapted to be actuated when each key is at the end of its full stroke, to trip the pawl and release the key-bar and key.

18. The combination of type-keys, a spacing-key, a key-bar, adapted to be moved by all the keys, a carriage mounted upon the key-bar, a star-wheel mounted upon the key-bar, a gear-wheel connected therewith having one portion of its periphery without teeth, a rack upon said carriage with which said gear-wheel meshes, a hook secured to the framework of the machine adapted to rotate said star-wheel each time the bar is actuated by a key and a spring to return said carriage to its normal position, whereby the carriage is advanced at each depression of a key until the toothless portion of said gear-wheel is reached, when the carriage is at once returned to its original position, a presser upon said carriage, a series of operating-levers, with each of which the presser is adapted in turn to engage when the key-bar is moved by the type-keys, and type-carrying disks adapted to be rotated by the operating-levers, whereby the number represented by the digits upon the type-keys depressed by the operator, will appear in the type of the type-carrying disks upon the printing or adding line.

19. The combination with keys, type-carrying disks, connecting mechanism for enabling the keys to operate the disks, of pawls for locking the disks in set position and devices for unlocking them, a locking-bar to hold the unlocking devices in operative position long enough to insure the return of the disks to their normal position, and means for releasing the locking-bar actuated by the first key when depressed for the next operation.

20. The combination with keys, type-carrying disks, a key-bar, operated by the keys, a movable carriage thereon carrying a presser adapted to operate the disks, of a series of pawls adapted to lock the disks in position, an arm adapted to press upon said pawls to unlock them from the disks, a toe projecting into the path of a part of the movable carriage as it rises from its furthermost position, and connecting mechanism between said finger and said arms, whereby when said finger is struck by the movable carriage, the disks will be unlocked and will return to their normal positions.

21. The combination with keys, type-carrying disks, a key-bar, operated by the keys, a movable carriage thereon carrying a presser adapted to operate the disks, of a series of pawls adapted to lock the disks in position, an arm adapted to press upon said pawls to unlock them from the disks, a toe adapted to be projected into the path of a part of the movable carriage as it rises from its furthermost position, a handle for moving said toe into or out of such path, and connecting mechanism between said toe and said arm, whereby when said toe is moved into the said path of, and is struck by, said movable carriage, the disks will be unlocked and will return to their normal position.

22. In a printing-machine, a platen composed of sections, which are removable in order to vary the width of the impression-surface, a groove in the platen-carrying piece for receiving and holding such removable sections, a platen-holder for each section of the platen having a portion the same in cross-section as the groove and adapted to fit into and slide therein, and adjustable means for securing the platen-holder therein.

23. In a printing-machine, the combination with type-carrying disks, type-form carriage and type-form, and means to feed them forward, of a platen composed of sections which are removable in order to vary the width of the impression-surface, a stop-cam to limit the forward feed of the type-form carriage, having different cam-surfaces whereby the said feed may be varied in extent to correspond to the varying widths of the printing-surfaces of the platen, and an index-finger to move the stop-cam.

24. In a printing-machine, the combination with type-carrying disks of a type-form carriage, a rack upon said carriage, a pawl engaging with said rack, hammer-impression mechanism and means for actuating said pawl to advance said rack actuated by the hammer-impression mechanism.

25. The combination of type-carrying mechanisms representing different numerical orders, a presser adapted to actuate successively the type-carrying mechanisms of different orders, keys adapted to operate the presser to cause it to actuate the type-carrying mechanisms to bring upon different printing-lines the type represented by the different keys operated, two sets of type upon the type-carrying mechanisms, each set the duplicate of the other set, one set adapted, when the type-carrying mechanisms are operated, to be brought upon a printing-line for printing upon removable impression-surfaces and the other set adapted upon such operation to be brought upon a different printing-line for printing upon a permanent recording-strip, whereby the same record of the type will be made upon a permanent recording-strip and upon removable impression-surfaces.

26. In a printing-machine the combination with a type-form carriage, and means for feeding the same forward at each actuation of the hammer-impression mechanism, of a spring-stop adapted to arrest the carriage at the proper point to enable the first line of type to be brought upon the printing-line upon the actuation of the hammer-impression mechanism, and adapted to be then pushed out of the way of the carriage.

27. The combination with type-carrying mechanism, a presser for actuating the same, a key-bar for operating the presser, and keys for moving the key-bar to cause it to operate the presser, of a locking device for preventing the return of the key and key-bar until the full stroke of the key has been made, mechanism for unlocking said device and an adjustable screw upon each key adapted at the end of the stroke of the key to make contact with said mechanism to cause it to unlock the said locking device, whereby the key-bar and keys will be returned to their original positions.

28. The combination with type-carrying mechanism, a presser for actuating the same, a key-bar for operating the presser, and keys for moving the key-bar to cause it to operate the presser, of a rack upon the key-bar, a pawl upon the framework of the machine adapted to engage with said rack when a key is depressed to lock the key-bar and key, mechanism adapted to trip the pawl, and an adjustable screw upon each key adapted at the end of the stroke of the key to make contact with said mechanism to cause it to trip the pawl and release the key-bar and keys, whereby the key-bar and keys will be returned to their original positions.

In testimony whereof I have signed my name to this specification in the presence of two subscribing witnesses.

WILLARD LE GRAND BUNDY.

Witnesses:
ROBERT PATTON,
JOSHUA W. CAPEN.